(12) United States Patent
Soli

(10) Patent No.: US 7,075,627 B2
(45) Date of Patent: Jul. 11, 2006

(54) DEVICE, SYSTEM AND METHOD FOR MEASURING REICHENBACH CLOCK SYNCHRONIZATIONS

(75) Inventor: George A. Soli, Vancouver, WA (US)

(73) Assignee: Integrated Detector Systems, LLC, Vancouver, WA (US)

( * ) Notice: Subject to any disclaimer, the term of this patent is extended or adjusted under 35 U.S.C. 154(b) by 349 days.

(21) Appl. No.: 09/863,778

(22) Filed: May 23, 2001

(65) Prior Publication Data

US 2003/0007221 A1 Jan. 9, 2003

(51) Int. Cl.
*G01P 3/36* (2006.01)
*G01P 21/00* (2006.01)

(52) U.S. Cl. .......................... 356/28; 250/526; 73/137
(58) Field of Classification Search ............... 342/104, 342/103; 356/28; 73/1.79, 1.37; 250/526
See application file for complete search history.

(56) References Cited

OTHER PUBLICATIONS

H. G. Winful; Nature of "Superluminal" Barrier Tunneling; Physical Review Letters, vol. 90, No. 2; Jan. 17, 2003.*
Cheung, "Quantum Universe", <http://interzone.com/~cheung/Page.dir/pg.metaworld2.html>, pp. 1-4.*
Vera L. Brudny et al; "On the apparent superluminality of evanescent waves"; Nov. 19, 2001/vol. 9, No. 11 / Optics Express; pp. 561-566.*
Andrian Kent; "Nonlinearity without Superluminality"; Apr. 2002 (revised Feb. 2005); Centre for Quantum Computation, Department of Applied Mathematics and Theoretical Physics, University of Cambridge; pp. 1-5.*
Raymond Y. Chiao, "Tunneling Times and Superluminality: a Tutorial", arXiv:quant-ph/9811019v1, Nov. 7, 1998; pp. 1-13.
Detlef Dürr, et al., "Hypersurface Bohm-Dirac models", Physical Review A, Oct. 1999, pp. 2729-2736, vol. 60, No. 4, The American Physical Society.
J. Peatros, et al., "Average Energy Flow of Optical Pulses in Dispersive Media", Physical Review Letters, Mar. 13, 2000, pp. 2370-2373, vol. 84, No. 11, The American Physical Society, USA.

(Continued)

Primary Examiner—Thomas H. Tarcza
Assistant Examiner—Isam Alsomiri
(74) Attorney, Agent, or Firm—Christie, Parker & Hale, LLP

(57) ABSTRACT

A device, system and method for measuring the one-way velocity of light using selective transmission technology to provide a "superluminal" energy flow is provided. The "superluminal" transmitter comprises a transmission source, a receiver, and a selective-transmission device for receiving the transmission wavepacket from the transmission source and selectively transmitting the wavefront component of the transmission wavepacket through a barrier such that the energy transmission tunnels through the barrier at "superluminal" group velocities. The measured daily oscillation of the tunnel time can then be utilized to measure the one way light velocity. A system and method for measuring the vector phase or group velocity of light using the "superluminal" transmitter system of the invention is also provided as well as a device which can be utilized as a compass, a calendar and/or a clock.

5 Claims, 8 Drawing Sheets

OTHER PUBLICATIONS

Achim Kempf, "Fields over Unsharp Coordinates", Physical Review Letters, Oct. 2, 2000, pp. 2873-2876, vol. 85, No. 14, The American Physical Society.

Jakub Rembieliński, "Superluminal Phenomena and the Quantum Preferred Frame", arXiv:quant-ph/0010026 v2, Nov. 23, 2000, pp. 1-4.

Clifford M. Will, "Clock Synchronization and Isotropy of the One-Way speed of Light", Physical Review D, Jan. 15, 1992, pp. 403-411, vol. 45, No. 2, The American Physical Society.

Delamotte "A Hint of Renormalization," arXiv:hep-th/021203493 v3, Sep. 5, 2003, pp. 1-6.

Fujikawa, Kazuo "Remarks on Shannon's Statistical Inference and the Second Law in Quantum Statistical Mechanics," arXiv:cond-mat/0005496 v4, Apr. 1, 2002, pp. 1-16.

Janis, "Conventionality of Simultaneity," The Stanford Encyclopedia of Philosophy (Fall 2002 Edition), URL=<http://plato.stanford.edu/archives/fall2002/entries/spacetime-convensimul/> pp. 1-7.

Penrose, Oliver "The Direction of Time," Heriot-Watt University, Riccarton, Edinburgh, UK, 2001, pp. 1-22.

Pine, "Understanding the Theory of Relativity," URL: (Mar. 2001) URL=<http://www.jersey.uoregon.edu/~js/21st_century_science/readings/pine2.html>, pp. 1-10.

"Hans Reichenbach (1891-1953)," Internet Encyclopedia of Philosophy, URL: http://www.utm.edu/research/iep/r/reichenb.htm, pp. 1-16.

Schatzer, Laro "The Speed of Light—A Limit on Principle?," URL:http://home.sunrise.ch/schatzer/space-time.html, pp. 1-11.

Traunmüller, "Measuring Time and Other Spatio-temporal Quantities," Apeiron 5: 213-218 (1998), pp. 1-7.

Ware, et al "Role of Group Velocity in Tracking Field Energy in Linear Dielectrics," Optics Express, Nov. 5, 2001, vol. 9, No. 10, pp. 506-518.

Hagiwara, K. et al., "Cosmic Background Radiation," Physical Review, D66, 010001-1, vol. 13, No. 57, Jun. 18, 2002, (pp. 1-14).

* cited by examiner

DEVICE, SYSTEM AND METHOD FOR MEASURING REICHENBACH CLOCK SYNCHRONIZATIONS

FIELD OF THE INVENTION

The present invention is directed to a device, system and method for measuring the Reichenbach clock synchronization coefficients and the resulting vector velocity of light.

BACKGROUND OF THE INVENTION

This invention relates in general to the determination of velocity as defined by the cosmic background Doppler shift by measuring the Reichenbach clock synchronization coefficients and the resulting vector velocity of light in the oscillations of photon tunneling times.

Einstein first introduced the idea of an ultimate particle speed known as c, the speed of light, with the publication of his special theory of relativity in 1905. Since this publication, scientists have shown that c is not an upper-limit on a particle's speed, but a barrier to acceleration. These mathematical studies have shown that while it is not possible to accelerate an object to a velocity faster than light, it is possible for an object to have a velocity greater than c.

In mathematical terms the one-way vacuum velocity of light from A to B is c(AB), which is described by the equation:

$$c(AB)=c/2\epsilon(AB) \qquad (1)$$

where $\epsilon(AB)$ are the Reichenbach clock synchronization coefficients. The vector velocity c(AB) is only isotropic in a preferred reference frame and the round trip vacuum speed of light, c, is constant because:

$$\epsilon(AB)=1-\epsilon(BA) \qquad (2)$$

In the Lorentz covariant theoretical work, without "superluminal" energy flow, any inertial frame can be chosen as the preferred frame. Only by using "superluminal" energy flow, then, can a single preferred reference frame be used to measure the vector vacuum velocity of light.

The first evidence of energy moving at velocities greater than c was observed by radio engineers at the turn of the century. They learned that radio signals in the upper atmosphere traveled faster than light. The reason was that the radio waves were moving through ionized gas and not normal air. In effect, these radio waves' pulses have two different velocities, a group velocity, or the velocity of the pulse packet, and a phase velocity, the velocity of the individual waves within the group. In this example, the phase velocity of the radio waves, or the internal velocity of the individual waves within the radio wave pulse packet were moving faster than light. A more complete discussion of these early "superluminal" radio wave experiments can be found in the text *Faster Than Light*, by Nick Herbert, pg. 56–58, (1988).

Systems designed to transmit energy at "superluminal" velocities are also well-known in the art of quantum mechanics. One type of conventional "superluminal" energy transport method employs the phenomenon known as quantum barrier penetration, or tunneling. Under quantum theory, a quantum particle can be thought of as a wave packet, its width in space related to its velocity through the Heisenberg Uncertainty Relation. A common interpretation of this wave packet is that it represents a probability distribution. This means that where the amplitude of the wave packet is the greatest corresponds to the position in space with the highest probability of finding, or measuring, the particle. When the quantum wave packet is incident upon a barrier, it is partially reflected off the barrier and partially transmitted through the barrier. Since the packet transmitted through the barrier is a portion of the original probability distribution there is a small but finite probability of measuring the location of the quantum particle on the far side of the barrier. This phenomenon is known as tunneling and is well-known and accepted. However, a question arises as to the time required for the particle to achieve barrier penetration.

Several groups studying the phenomena of tunneling have shown that the tunneling velocities, or interaction times, for a variety of particles to pass through a barrier exceed c. For example, "superluminal" velocities have been measured for light pulses traveling through an absorbing material. "Superluminal" velocities have also been measured for the propagation for microwaves through a "forbidden zone" inside square metal waveguides. For a more detailed discussion of these experiments see, NEW SCIENTIST, vol. 146, pg. 27 (1995).

More recently, a group at the University of California at Berkeley measured "superluminal" tunneling times for visible light tunneling through a dielectric mirror using a Hong-Ou-Mandel interferometer. Similar experiments by a group in the University of Vienna in 1994 confirmed the Berkeley study and also showed that "superluminal" tunneling times could be obtained for increasingly large barrier thicknesses. For a more detailed discussion of these experiments see, NEW SCIENTIST, vol. 146, pg. 29 (1995).

Finally, in 1995, a group headed by Prof. Nimtz sent a microwave signal broadcasting Mozart's $40^{th}$ Symphony across 12 cm of space at 4.7 times the speed of light. For a more detailed discussion of this experiment see, NEW SCIENTIST, vol. 146, pg. 30 (1995).

In effect, these experiments show that tunnel times are independent of tunnel length, demonstrating the Hartman effect and tunneling. Under this regime the tunneling time, $\Delta t$, is a saturated value and the Heisenberg uncertainty principle is written as follows:

$$\Delta\tau\Delta E=\hbar(1+O)/2 \qquad (3)$$

where, $\hbar$, is the Heisenberg constant and, O, represent the higher order corrections to the tunneling time. This principle is referred to as the "energy borrowing" uncertainty principle, where the energy $\Delta E$, must be "paid back" in a time less that $\Delta t$, regardless of the energy flow speed or group velocity required to do so. A more detailed explanation of the physics of tunneling is provided in the following references, each incorporated herein by reference: R. Y. Chiao, "Tunneling Times and Superluminality: a Tutorial", quant-ph/9811019, 7 Nov. 1998, at LANL; J. Jakiel et al., "On Superluminal Motions in Photon and Particle Tunnelings", quant-ph/9810053, 16 Oct. 1998, at LANL; A. Kempf, "A generalized Shannon Sampling Theorem, Fields at the Plank Scale as Bandlimited Signals", hep-th/9905114, 2 Mar. 2000, at LANL; P. Bamberg and S. Sternberg, "A course in Mathematics for Students of Physics 2", Cambridge University Press 1990, Sect. 21.4; J. Rembielinski, "Superluminal Phenomena and the Quantum Preferred Frame", quant-ph/0010026, 6 Oct. 2000, at LANL; J. Rancourt, "Optical Thin Films User Handbook", SPIE Optical Engineering Press, 1996, Apendix C; Hawking & Ellis, "The Large Scale Structure of Space-Time", Cambridge University Press, 1973, Sect. 4.3.

While these experiments and texts clearly show the possibility of transmitting various forms of electromagnetic radiation faster than the speed of light, thus far no system has been developed to determine the one-way velocity vector of light utilizing these "superluminal" energy transmissions.

SUMMARY OF THE INVENTION

The present invention is directed to a device, system and method for measuring the one-way velocity of light using selective transmission technology to provide a "superluminal" energy flow.

This invention utilizes selective transmission technology to provide a "superluminal" energy flow. Selective transmission technology actively selects the wavefront components within a wavepacket for transmission through a Quantum barrier. The selective transmission technology or device accomplishes this by choosing a Quantum barrier, or air gap length, that selectively transmits only the wavefront of a wavepacket. The selective transmission device can then transmit these wavefront components more efficiently, giving these components a head start. These wavefront components contain Quantum information that is then used to completely reconstruct the wavepacket on the far side of the barrier before the energy of a free photon would have arrived on the far side. The transmitted wavefront information is used to completely reconstruct the wavepacket with energy borrowed from the vacuum on the far side of the barrier. The energy in the photon before the barrier must traverse the barrier at a speed that is FASTER than the vacuum speed of light. This is required to "pay-back" the energy borrowed from the vacuum on the far side of the barrier in a time that is equal to the time allowed by Quantum mechanics, or by the saturated Heisenberg energy borrowing uncertainty principle. This Quantum requirement along with the selective-transmission technology generates "superluminal" group velocities and "superluminal" energy flow. In summary, the chosen air gap length amplifies the front part of the wavepacket using energy borrowed from the vacuum and Quantum information provided by selectively transmitted wavefront wavepacket components to completely reconstruct the wavepacket on the far side of the Quantum barrier. This causes "superluminal" energy flow that is required to pay back the energy debt within the time required by Quantum mechanics. However, because of the time it takes to prepare the energy for "superluminal" transmission using selective-transmission technology the "superluminal" energy flow contains no "superluminal" classical-information.

When the tunneling direction is in the direction of the red shift in the cosmic microwave background the tunneling time is shortest, and when the tunneling is in the blue shift direction the tunneling time is longest. Because the measured daily oscillation of the tunnel time is equivalent to the change in the vector vacuum velocity of light with tunneling direction and the tunneling direction is itself equivalent to the cosmic microwave background dipole direction created by the Doppler shift caused by the Earth's motion, the one-way light velocity can be measured.

In light of the above, in one embodiment, the invention is directed to a "superluminal" transmitter device comprising a transmission source, a receiver, and a selective-transmission device for receiving the transmission from the transmission source and selectively transmitting only the wavefront portion of the transmission through a barrier.

In a particular embodiment, the selective-transmission device comprises an air-gap barrier having proximal and distal ends formed from effective transmission barriers and an air gap disposed between the proximal and distal barriers such that a transmission from the transmission source enters the proximal end of the barrier tunnels across the air gap and exits the distal end of the barrier. In this embodiment, the length of the air-gap is dependent on the wavelength of the wave-packet transmission such that the length of the air-gap is adjusted to efficiently transfer the wavefront of the transmission wave-packet.

In another particular embodiment, the transmission source comprises a radio source in signal communication with a transmission antenna and the receiver comprises an amplifier in signal communication with a receiver antenna.

In yet another particular embodiment, the invention is directed to a compass, comprising using the selective transmission device to measure the vector velocity of light.

In still another particular embodiment, the invention is directed to a clock and calender, comprising using the selective transmission device to measure the vector velocity of light relative to the Earth's motion.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
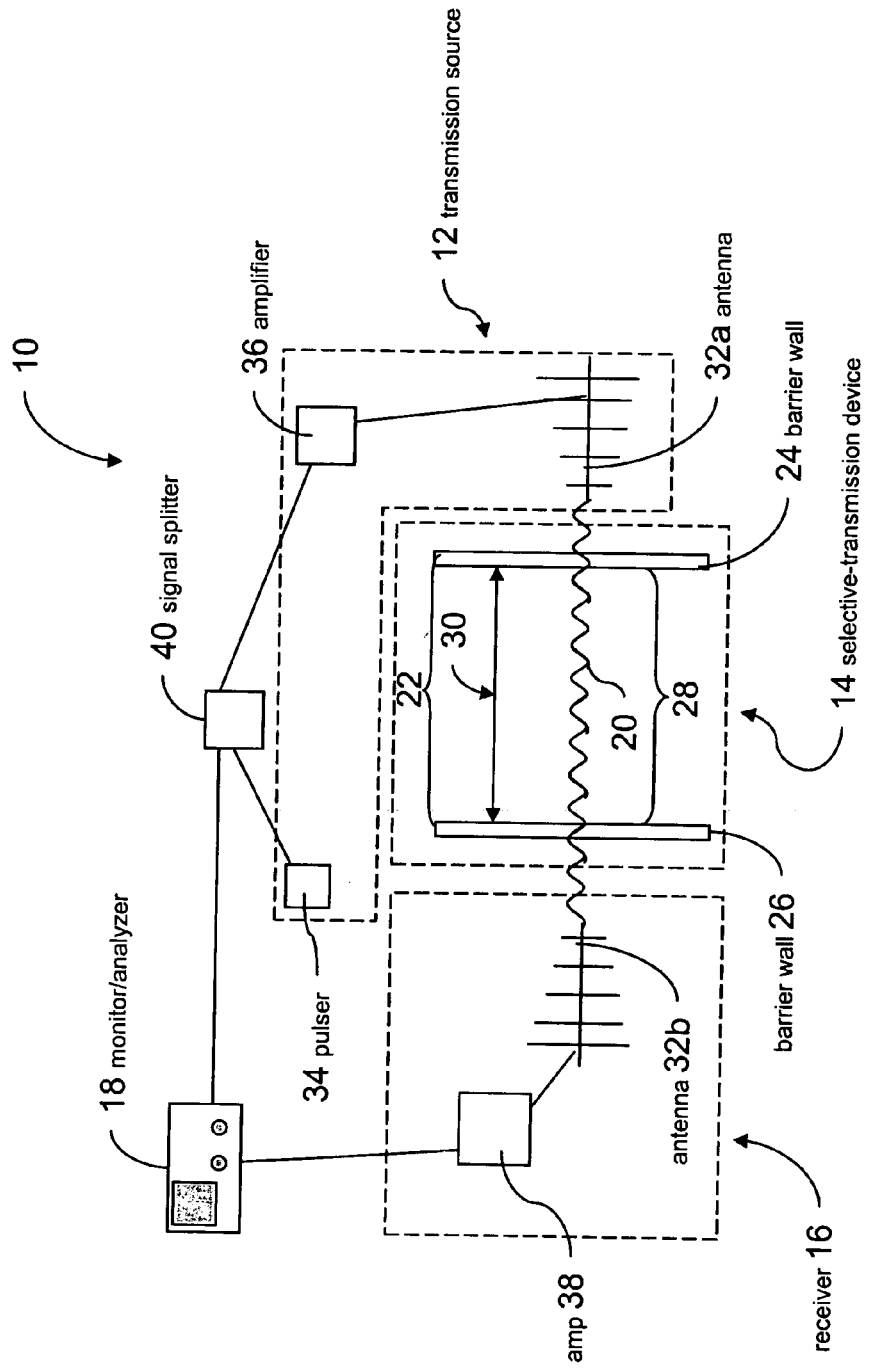
FIG. 1 is a schematic view of an embodiment of the "superluminal" energy transmission device according to the invention.

The present invention is directed to a "superluminal" transmission device for measuring the vector velocity of light. In one embodiment, as shown in FIG. 1, the "superluminal" transmission device 10 comprises a transmission source 12, a selective-transmission device 14 adapted to receive a transmission from the transmission source 12, a receiver 16 in signal communication with the selective-transmission device 14 and a monitor 18 adapted to communicate the transmission to a user.

A transmission wavepacket 20 having a wavefront component is introduced into the selective-transmission device 14 from the transmission source 12 such that the transmission wavepacket 20 is conducted through the space between the transmission source 12 and the receiver 16 to the monitor 18 at velocities faster than the speed of light. The selective-transmission device 14 is placed in proximate relation to the transmission source 12 such that the transmission wavepacket 20 passes through the selective-transmission device 14 and the wavefront component of the transmission wavepacket 20 is transmitted into the receiver 16 creating a signal. A receiver or series of receivers 16, are adapted to receive the signal and transmit the signal to a monitor 18 in signal communication therewith. Any device having the ability to detect changes in amplitude, frequency, phase or wavelength of the transmission 20 can be used as a receiver 16 and monitor 18, such as, for example, a radio amplifier in signal communication with an oscilloscope or a Time to Digital Converter (TDC). Additionally, any suitable transmission source 12 may be used in the subject invention, such as, for example, a microwave generator or a radio transmitter so long as detectable levels of electromagnetic radiation are transmitted to the receiver 16 in the form of a transmission wavepacket 20.

In general terms, the selective-transmission device 14 comprises a quantum air-gap barrier 22, which is in signal communication with the transmission source 12. The quantum air-gap barrier 22 comprises a proximal 24 and distal 26 barrier wall and an air-gap 28 having a tunneling, or air-gap, length 30 disposed therebetween. The proximal barrier wall 24 is in signal communication with the transmission source 12 and the distal barrier wall 26 of the air-gap barrier 22 is in signal communication with the receiver 16. The transmission 20 from the transmission source 12 interacts with the air-gap barrier 22 which selectively transmits the wavefront component of the transmission wavepacket 20 across the air-gap 28 to the receiver 16 at subluminal velocities. The air-gap barrier 22 generates "superluminal" transmission velocities in the wavepacket group component of the transmission 20 by selecting the wavefront component of the transmission wavepacket 20 and more efficiently transmitting that wavefront component across the air-gap 28. The wavefront component of the transmission wavepacket 20, is selected by arranging the proximal 24 and distal 26 barrier walls such that the air-gap length 30 therebetween corresponds to quarter wavelength or multiples thereof of the wavefront component of the transmission wavepacket 20. By selecting the air-gap length 30 to correspond to the wavelength of the wavefront component of the total transmission wavepacket 20, the air-gap barrier 22 provides the wavefront component of the transmission wavepacket 20 a head start, in effect causing tunneling of the wavefront component, or tunneling transmission across the air-gap 28 in a tunneling time that is independent of the tunnel distance, or air-gap length, 30, thus causing the tunneling transmission to cross the air-gap 28 at a "superluminal" group velocity. Any air-gap barrier 22 construct suitable for selecting the wavefront component of the transmission wavepacket 20 from a transmission source 12 and transmitting the wavefront component of the wavepacket 20 across an air-gap 28 at subluminal velocities with a headstart causing "superluminal" group velocities may be used such as, for example, square metal waveguides for microwave transmissions or tanks having a high index of refraction substance such as water for radio transmissions.

In one preferred embodiment, a radio transmission source 12, a radio receiver 16 and an air-gap barrier 22 comprising a proximal tank 24 and a distal tank 26 aligned parallel to each other across an air-gap 28 are utilized to generate the "superluminal" transmissions. The proximal tank 24 is placed in signal communication with the transmission source 12 and the distal tank 26 is placed in signal communication with the receiver 16. The tanks 24 and 26 are arranged such that an air-gap 28 is created between having an air-gap length 30 In this embodiment, the tanks 24 and 26 may have any index of refraction suitable to act as a quantum barrier such as, for example, a Plexiglas™ tank filled with water.

To transmit the transmission wavepacket 20 to and from the selective-transmission device 14, the transmission source 12 and receiver 16 must be positioned relative to selective-transmission device 14 such that the transmission wavepacket 20 passes through the selective-transmission device 14. In the embodiment shown in the attached figures, a radio transmission source 12 and a radio receiver 16 utilize antennas 32 directed at the selective-transmission device 14. However, any suitable design can be used such that the transmission 20 from the transmission source 12 passes through the selective-transmission device 14 and enters the receiver 16.

A prototype of the "superluminal" transmission device 10 described above was constructed. A NIM-logic pulser 34 (Phillips Scientific model 417 Nuclear Instrumentation Standard Pocket Pulser) in signal communication with an amplifier 36 (RadioShack catalog # 15-1113C) is used as the transmission source 12 and is placed in signal communication with a five-element folded-dipole Yagi antenna 32a designed for two-meter wavelength radio waves. A second amplifier 38 (RadioShack catalog # 15-1170) in signal communication with a second five-element folded-dipole Yagi antenna 32b is used as the receiver 16. Both antennas 32a and 32b comprise ¼ inch aluminum ground wire reflector and deflectors, and a #10 copper wire folded dipole. 75 ohm to 300 ohm transformers, (RadioShack catalog # 15-1140), are connected to 75 ohm cables at the antennas 32a and 32b. Each antenna 32a and 32b is also surrounded by an aluminum screen (not shown), with a 114 cm wide opening along the folded-dipole direction to selectively transmit and receive a signal wavelength at <228 cm. The signal from the receiver amplifier 16 is fed into an oscilloscope monitor 18 (Tektronix TDS220). Alternatively a TDC could be utilized as a monitor 18, such as, for example, an ORTEC 9308 Picosecond Time Analyzer preceded by a 9307 pico-Timing Discriminator. The transmission source 12 signal is also monitored by the oscilloscope monitor 18 via a signal splitter 40 which is placed in signal communication with the radio-wave pulser 34. The cables leading from the transmission source 12 and the receiver 16 to the oscilloscope monitor 18 are terminated into 75 ohms.

The selective-transmission device 14 comprises an air-gap barrier 22 having proximal 24 and distal 26 barrier walls arranged such that an air-gap 28 lies therebetween. The proximal 24 and distal 26 barrier walls consist of two 4 ft wide and 2 ft high distilled water tanks. The distilled water layer thickness in each tank is 12.7 mm or ½ inch and the index of refraction is n=9 and k=0.002. The water tanks are constructed with ¼ inch thick Plexiglass having an index of refraction of n=1.6 and k=0.0. The proximal 24 and distal 26 barrier walls can be adjusted such that the air-gap length 30 between them extends up to 270 cm.

Figure 2:
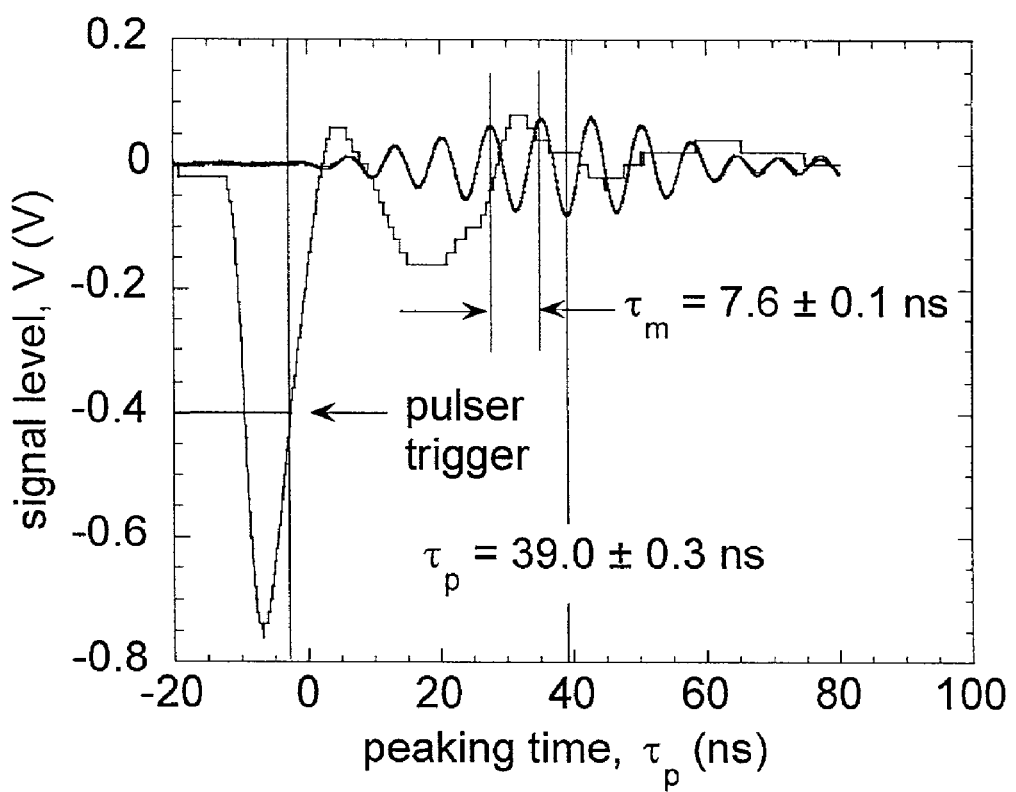
FIG. 2 is a graphical representation of the of the "superluminal" transmission properties of the present invention.

FIGS. 2 to 7 show the results of a typical "superluminal" transmission absent a signal pulse for the "superluminal" transmission device prototype 10 shown in FIG. 1. During a transmission, the source amplifier 36 gain is set at the minimum level and the FM trap is turned on. The cable lengths are adjusted such that the pulser 34 trigger pulse arrives at the oscilloscope monitor 18 just prior to the transmission wavepacket wavefronts 20. Each transmission measurement contains 128 samples, averaged by the oscilloscope monitor 18. The source data, or standard is taken with only the proximal barrier wall 24 in place. All error bars are the standard deviation of five data set measurements. FIG. 2 shows data from a source wavepacket measurement. The measured peak to peak time, $\tau_m$, for the source wavepacket is 7.6±0.1 ns, giving a photon wavelength of 228 cm. The large pulse shown below 0 peaking time, $\tau$ p, is the pulser trigger which is the rising edge set at −0.4 volts. The peaking time of the source wavepacket, τ p, relative to the pulser trigger is 39.0±0.3 ns. Table 1, below, shows the peak to peak separation times of the various components of the transmission wavepacket 20. As shown for peak numbers 1 to 3, the higher energy, or lower wavelength, components are in the front part, or nearer the wavefront, of the transmission wavepacket 20. It is these wavefront components of the transmission wavepacket 20 that are selectively transmitted by the "superluminal" transmission device 10 described above.

TABLE 1

Peak to Peak Separation Times

| Peak Numbers | Peak to Peak Time (ns) | Wavelength (cm) |
|---|---|---|
| 1 to 2 | 6.8 | 204 |
| 2 to 3 | 6.8 | 204 |
| 3 to 4 | 7.2 | 216 |
| 4 to 5 | 7.6 ± 0.1 | 228 |
| 5 to 6 | 7.6 | 228 |

Figure 3:
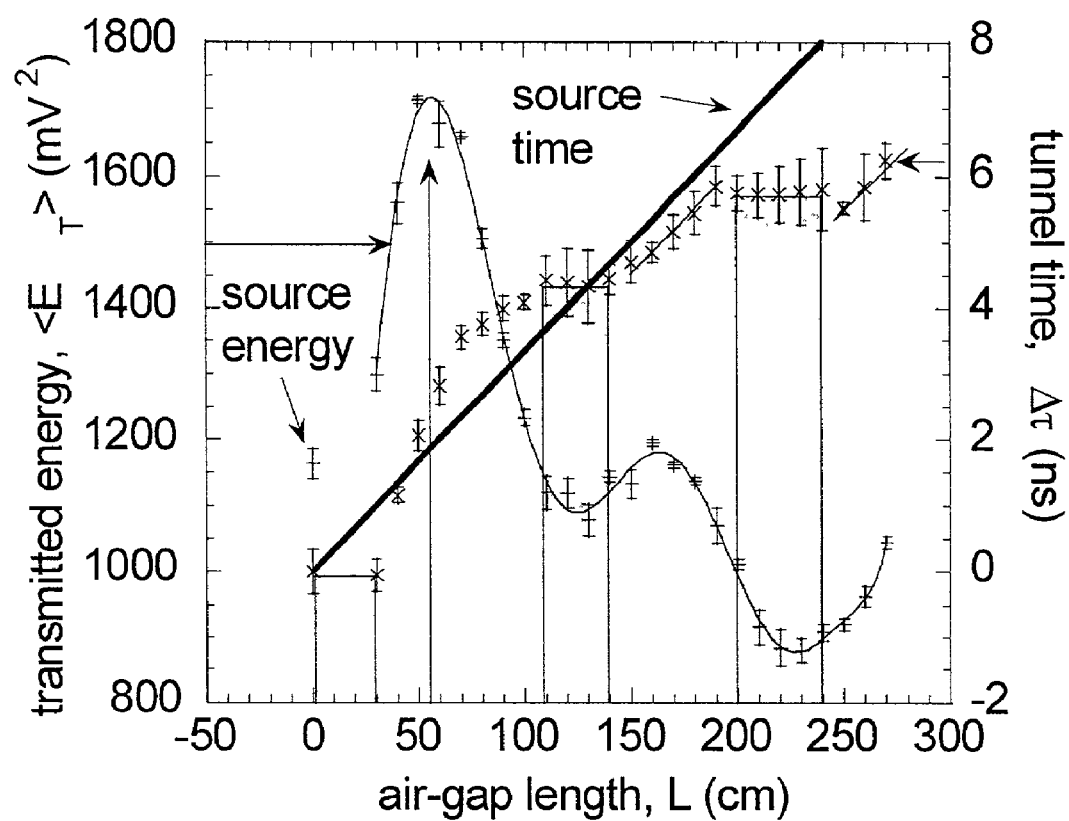
FIG. 3 is a graphical representation of the "superluminal" transmission properties of the present invention.

In FIG. 3, the transmitted energy, $E_T$ (mV$^2$), averaged over time, <$E_T$>, from 0 to 80 ns, is shown verses the air-gap length, L (cm). The maximum transmitted energy, $E_T$, over 0 to 80 ns occurs at an air-gap length of 57 cm. This energy peak is identified as a 228 cm photon quarter wavelength, indicating that the shorter air-gap lengths transmit the quarter wavelength or higher energy components of the transmission wavepacket 20 more efficiently. This is the mechanism that preferentially selects the front part, components, of the wavepacket 20 for transmission and generates the "superluminal" group velocities shown for a 30 cm air-gap length 30. The tunneling time, Δτ (ns), is also shown verse the air-gap length, L (cm), in FIG. 3. The flat tops of the shaded boxes identify the regions where the tunneling time is independent of the tunnel, or air-gap, length 30. As previously described, the tunneling time is defined by the "energy borrowing" Heisenberg uncertainty principle of Equation (3), where the energy must be "paid back" in a time less than the tunneling time regardless of the energy flow speed or group velocity required. The wavepacket 20 that tunnels through the air-gap 28, peaks prior to the source, or non-tunneling, wavepacket. The measured peaking time difference is defined by the equation:

$$\tau_g = \tau_p - 96_{psource} \quad (4)$$

where, $\tau_g$, is the measured group delay time. The tunnel time is then defined by the equation:

$$\Delta\tau = (L/c) + \tau_g \quad (5)$$

where, (L/c), is the source time. Peaking times, group delay times and tunnel times as measured during a transmission measurement are listed in Table 2, below.

TABLE 2

Wavepacket Peak Times, Group Delay Times and Tunnel Times

| Air-Gap Length (cm) | $\tau_p$ (ns) | $\tau_g$ (ns) | τ (ns) |
|---|---|---|---|
| source | 38.96 ± 0.33 | — | — |
| 200 | 38.05 ± 0.26 | −0.91 ± 0.42 | 5.75 ± 0.42 |
| 210 | 37.69 ± 0.33 | −1.27 ± 0.47 | 5.73 ± 0.47 |
| 220 | 37.35 ± 0.26 | −1.60 ± 0.52 | 5.73 ± 0.52 |
| 230 | 37.07 ± 0.48 | −1.89 ± 0.58 | 5.77 ± 0.58 |
| 240 | 36.77 ± 0.60 | −2.19 ± 0.68 | 5.80 ± 0.68 |

As shown, the tunnel time is independent of the length of the air-gap 28, indicating an increase in the negative group-delay time for the tunneling portion of the transmission wavepacket 20 as the air-gap length 30 is increased. As shown by FIG. 3, for air-gap lengths between 200 and 240 cm the tunnel time is less than the source time or vacuum speed of light, c. The increase in the tunnel time standard deviations with increasing tunnel length measure a lower bound in the tunnel time distributions that are proportional to the tunnel length.

Figure 4:
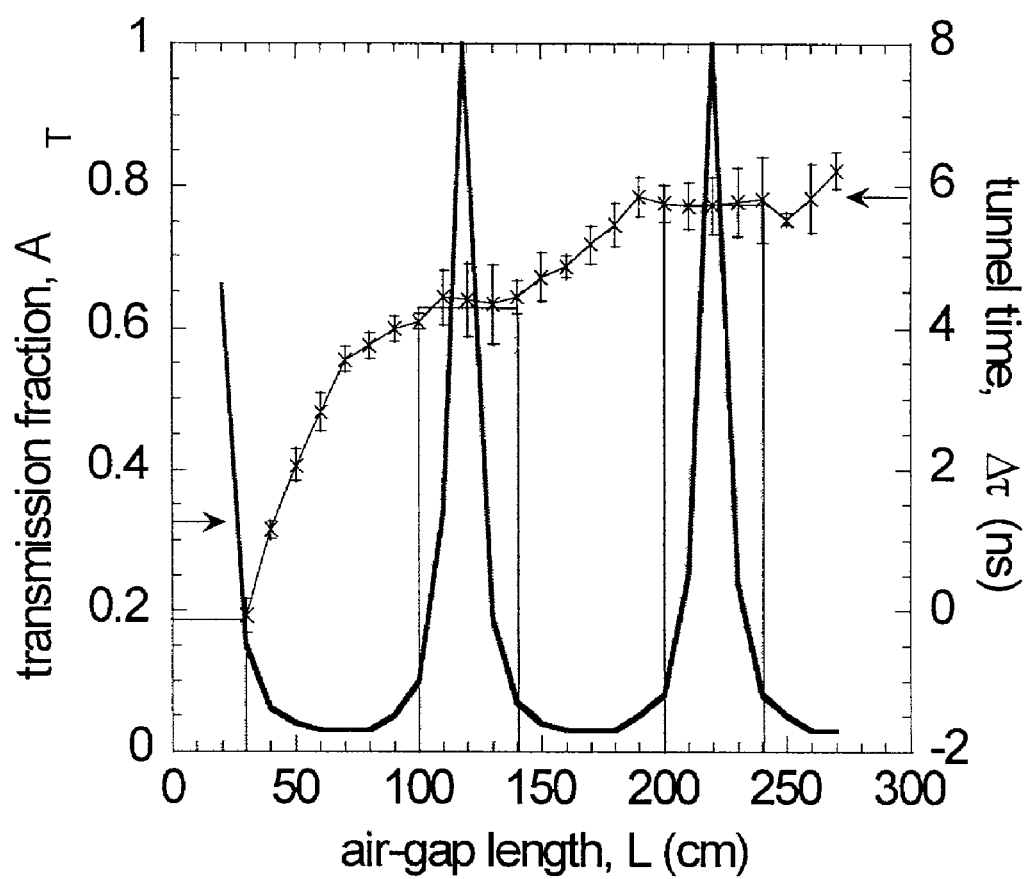
FIG. 4 is a graphical representation of the "superluminal" transmission properties of the present invention.

FIG. 4, shows a graph plotting the transmission fraction and tunneling time for a 204 cm wavelength photon verses the air-gap length. The boxes in the figure again show the regions where the tunnel time is independent of the tunnel length. This plot also shows that those regions where the tunnel time is independent of the tunnel length coincide with the selective transmission of the wavepacket front. Thus, selective transmission of the wavefront component of the transmission wavepacket 20 causes "superluminal" group velocities in those transmitted components.

Figure 5:
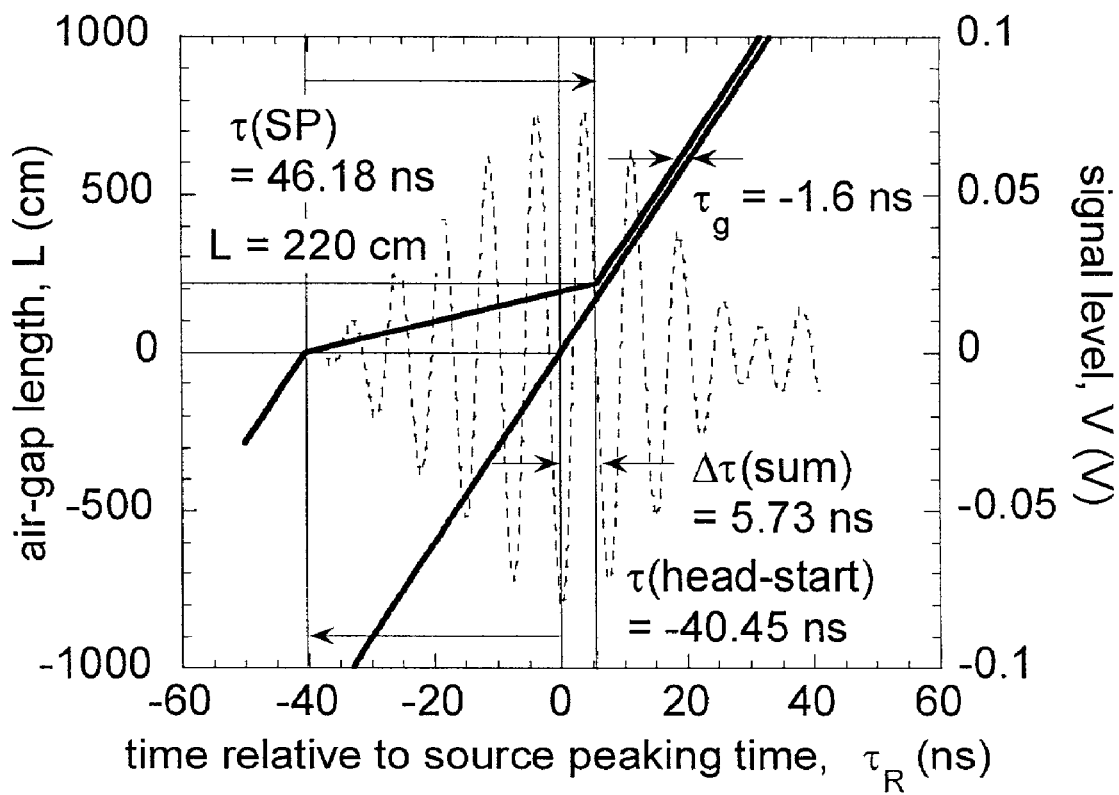
FIG. 5 is a graphical representation of the "superluminal" transmission properties of the present invention.

FIG. 5 graphically shows the effect of this selective transmission. Data for this graph was taken from one 128 sample source data set for an air-gap length of 220 cm. In this measurement a 204 cm wavelength wavefront 20 with a transmission fraction of 0.997 is utilized and the wavepacket front is being actively selected. The straight bold line shows the vacuum speed of light, while the bent bold line depicts the subluminal speed of the selective transmission of the wavefront component of the wavepacket 20. As shown, the selective transmission creates subluminal velocities in the wavefront components that are much less than c but not enough less to hold the energy luminal because they have a headstart. In mathematical terms, the stationary phase tunnel time, $\tau_s$, given by:

$$\tau_s = \frac{\partial \phi}{\partial \omega} \quad (6)$$

added to the head-start time, $\tau_h$, caused by selecting the wavefront wavepacket components equals the group velocity tunnel time, Δτ. The stationary phase tunnel time, give by Equation 6, is $\tau_s$=46.18 ns, its peak (or group) value. The head-start time is defined by the equation:

$$\tau_h = \Delta\tau - \tau_s \quad (7)$$

where, τ=5.73 ns, and $\tau_h$=−40.45 ns. Under these conditions the head-start time is also defined by the equation:

$$\tau_h = \tau_g - \tau_{psource} \quad (8)$$

where, $\tau_h$=−40.56 ns. Indicating that by selecting these wavefront components 42 a 40.56 ns head-start can be generated in the transmission, advancing the energy 1.6 ns for "superluminal" energy flow.

Figure 6:
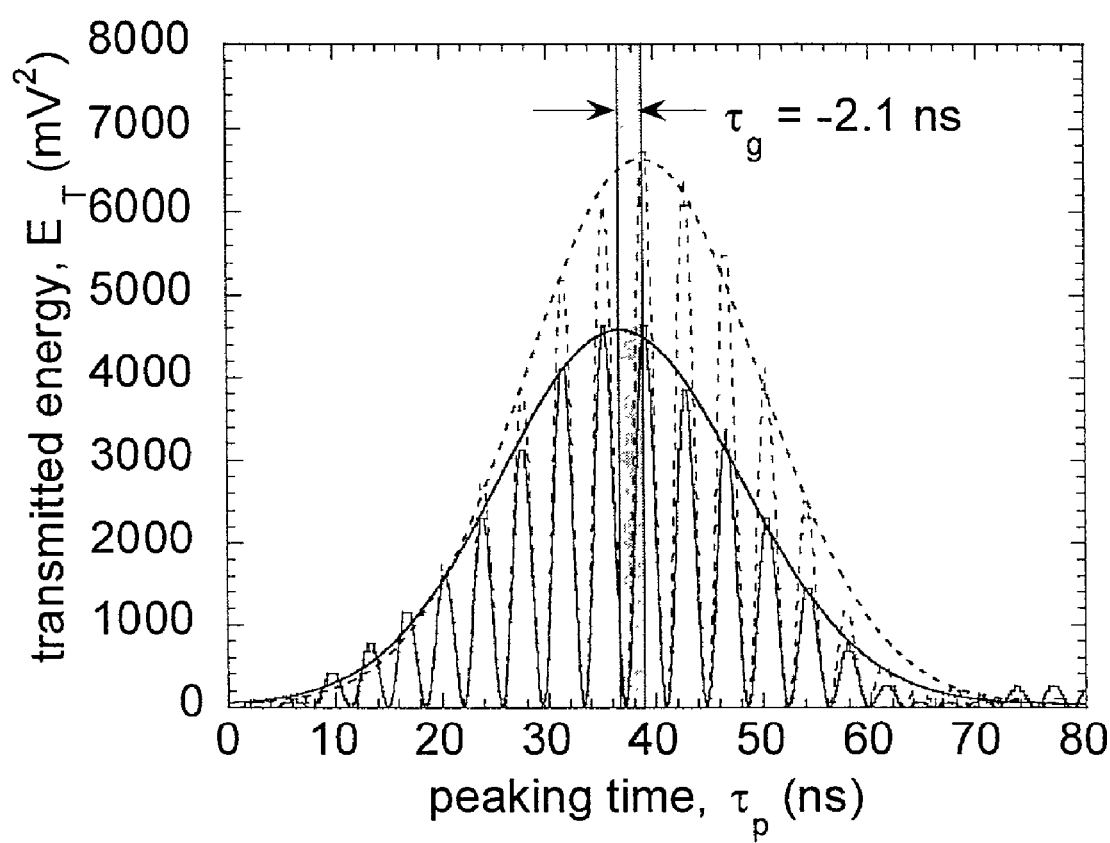
FIG. 6 is a graphical representation of the "superluminal" transmission properties of the present invention.
Figure 7:
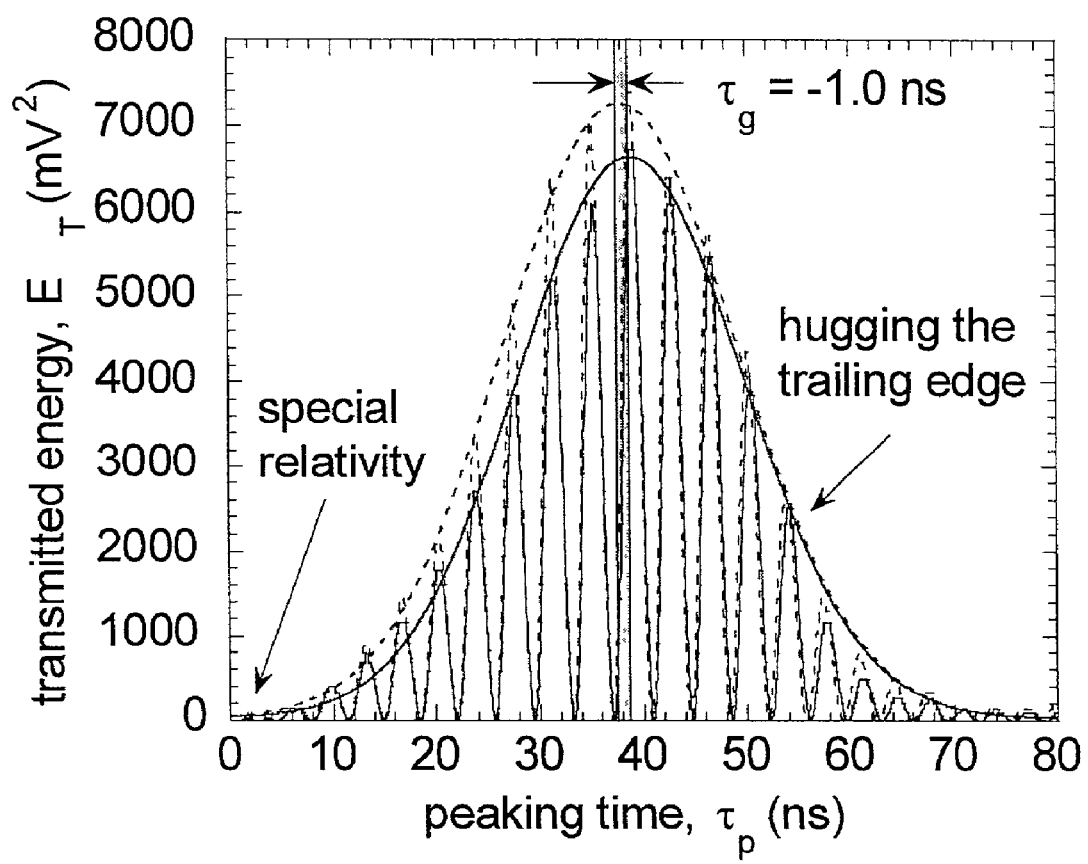
FIG. 7 is a graphical representation of the "superluminal" transmission properties of the present invention.

FIGS. 6 and 7 show tunnel and source data for single data sets, each containing 128 samples averaged by the scope. The tunnel data for FIG. 6 is from a measurement taken utilizing an air-gap length of 220 cm. The negative group delay time of −2.1 ns is for this data set. The group delay time average over all five data seta taken at 220 cm is −1.6 ns. In this plot, the tunneled wavepacket contains less energy than the source wavepacket. However, from the transmission fraction analysis it is shown that the front part of the wavepacket is amplified more than the tail part, producing negative group delay times. For the 30 cm air-gap length, shown in FIG. 7, the tunneled energy is greater than the source energy as shown in FIG. 3 and the tunneled wavepacket hugs the trailing edge of the source wavepacket. This effect identifies a causality restriction. The tunneled and source wavefronts must be simultaneous as required by the special theory of relativity. Causality requires the computed tunnel time to be $\tau=[(2L/c)-\tau_s]$ for air-gap lengths of 30 through 70 cm.

Figure 8:
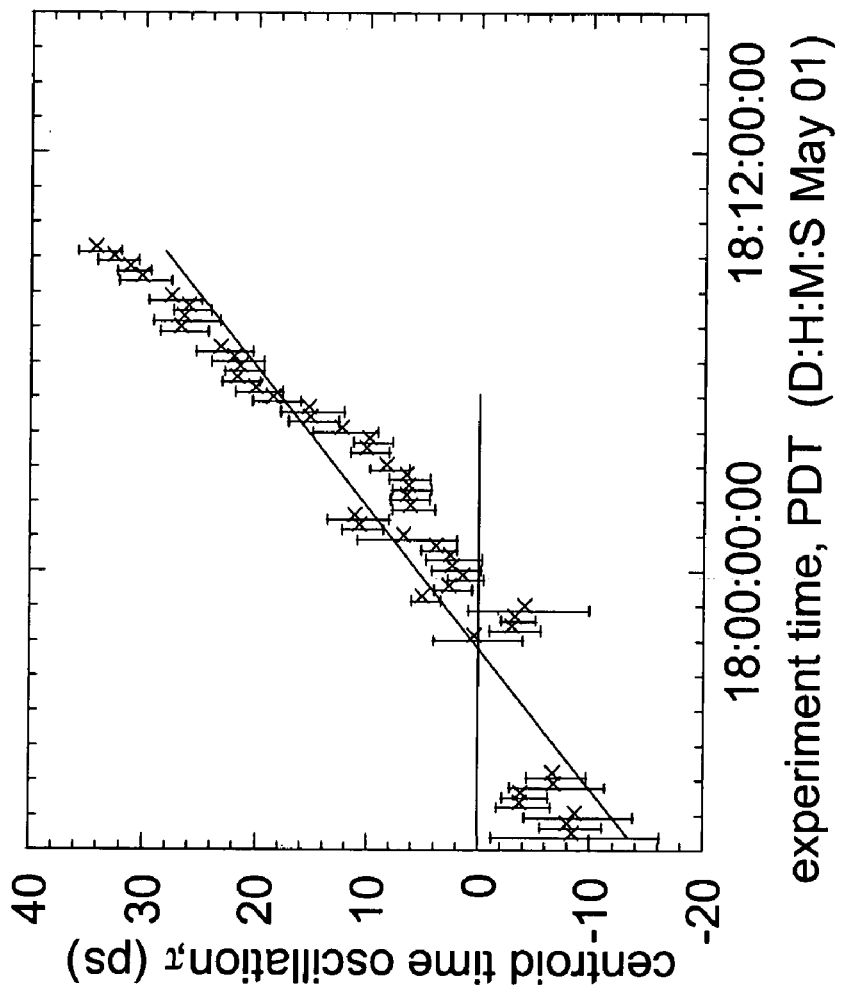
FIG. 8 is a graphical representation of the "superluminal" transmission properties of the present invention.

FIG. 8 shows a measurement of the daily oscillation of the centroid time (which is used to define the tunneling time which is equivalent to the change in the vector vacuum group velocity of light) with tunneling direction. This tunneling direction is in turn equivalent to the cosmic microwave background dipole direction created by the Doppler shift caused by the Earth's motion. Accordingly, the one way light velocity and Reichenbach coefficients can be measured.

The Doppler redshift direction vector points in the direction of declination 7.22° closest to the sun on March $7^{th}$ with a right ascension of 23.20 h and is in the opposite direction to the Earth's motion that causes the cosmic microwave background Doppler shift.

The measured daily oscillation of the tunnel time is equivalent to the change in the vector vacuum group velocity of light with tunneling direction. When the tunneling direction is in the direction of the red shift in the cosmic microwave background the tunneling time is shortest. When tunneling is in the blue shift direction the tunneling time is longest.

The measured daily oscillation of the tunnel time is due to a change in the vector vacuum group velocity of light c(AB), as a function of tunneling direction (AB), and the Reichenbach clock coefficients, as described in Equations (1) and (2). Utilizing the prototype system, the one-way light group velocity can be measured and compared with these theoretical values.

The vector vacuum phase velocity of light was measured at an air-gap length of 220 cm. FIG. 8 shows a histogram mean value data of the centroid time over a twenty-four hour period of measurement. The 9308 has a histogramming bin width of 1.22 ps over the 80 ns window. At L=220 cm, the standard deviation lower bound, $\Delta\tau(min)1=\Delta X/2c=507$ ps, requiring millions of pulser pulses to decrease the error in the centroid time histogram mean value below a picosecond. The 9307-discriminator level was set as high as possible without effecting the count rate. The tunneling direction was parallel to the Earth's surface at 108°, fixing the tunneling direction declination at −12°. A typical data set showing peak time statistics in ns for ten spectrum centroids is summarized in Table 3, below:

TABLE 3

Tunneling Time Oscillation Data

| | |
|---|---|
| Mean | 47.010 |
| Median | 47.011 |
| RMS | 47.010 |
| Standard Deviation | 0.0029258 |
| Variance | $8.5604e^{-6}$ |
| Standard Error | 0.00092523 |
| Skewness | 1.0718 |
| Kurtosis | 0.97325 |

As the measured daily oscillation of the centroid time is equivalent to the change in the vector vacuum phase velocity of light with tunneling direction, and as the tunneling direction is equivalent to the cosmic microwave background dipole direction created by the Doppler shift caused by the Earth's motion, the one way light phase velocity is measured, and the Reichenbach clock synchronization coefficients can be determined.

Although the above embodiment was only utilized to measure the one way light phase velocity, it will be obvious to one of skill in the art that other uses for the oscillating tunneling time measurements could be made. For example, using the tunneling time oscillation to measure the group velocity of light. In addition, the vector group velocity of light can be used as a compass relative to the cosmic background Doppler redshift direction or as a clock and calendar by also knowing the Earth's motion.

Although specific embodiments are disclosed herein, it is expected that persons skilled in the art can and will design alternative light velocity vector measurement systems that are within the scope of the following claims either literally or under the Doctrine of Equivalents.

What is claimed is:

1. A method for determining the date and time comprising:

utilizing a wavepacket transmitter to measure the oscillation of the group velocity over a specified period of time, determining the Doppler redshift direction from said group velocity oscillation, and comparing said Doppler redshift direction verse the Earth's motion wherein the wavepacket transmitter comprises:
a transmission source for generating a wavepacket, the wavepacket comprising a wavefront component;
a signal controller for generating a signal pulse;
a signal receiver for receiving the signal pulse;
a selective-transmission device comprising a quantum barrier defining a transmission distance, said selective-transmission device being in signal communication with the transmission source, the signal controller, and the receiver such that the wavepacket is transmitted to the barrier and the wavefront component of the wavepacket tunnels through the barrier and across the transmission distance to the receiver; and
a monitor in signal communication with the receiver for determining the centroid time for each of a plurality of wavepacket peaks; and
an analyzer for computing the vector group velocity of light from the measured centroid times.

2. A method for determining the time and date comprising:

utilizing a wavepacket transmitter to compare the direction of the cosmic microwave background Doppler red shift relative to the Earth's motion;

wherein the comparison includes determining the direction of the cosmic microwave background Doppler redshift by using the wavepacket transmitter to measure the oscillation of group velocity over a specified period of time and determining the group velocity minimum wherein the wavepacket transmitter comprises:
a transmission source for generating a wavepacket, the wavepacket comprising a wavefront component;
a signal controller for generating a signal pulse;
a signal receiver for receiving the signal pulse;
a selective-transmission device comprising a quantum barrier defining a transmission distance, said selective-transmission device being in signal communication with the transmission source, the signal controller, and the receiver such that the wavepacket is transmitted to the barrier and the wavefront component of the wavepacket tunnels through the barrier and across the transmission distance to the receiver; and a monitor in signal communication with the receiver for determining the centroic time for each of a plurality of wavepacket peaks; and an analyzer for computing the vector group velocity of light from the measured centroid times.

3. A wavepacket transmission device, comprising:

a transmission source for generating a wavepacket, the wavepacket comprising a wavefront component;

a signal controller for generating a signal pulse;

a signal receiver for receiving the signal pulse;

a selective-transmission device comprising a quantum barrier defining a transmission distance, said selective-transmission device being in signal communication with the transmission source, the signal controller, and the receiver such that the wavepacket is transmitted to the barrier and the wavefront component of the wavepacket tunnels through the barrier and across the transmission distance to the receiver; and a monitor in signal communication with the receiver for determining the centroid time for each of a plurality of wavepacket peaks; and an analyzer for computing the vector group velocity of light from the measured centroid times;

wherein the analyzer further determines the cosmic microwave background Doppler red shift direction by monitoring the group velocity tunneling time oscillation over a specified period of time and determining the group velocity tunneling time minimum.

4. The wavepacket transmission device as described in claim 3, wherein the analyzer further determined the date and time by computing the cosmic microwave background Doppler red shift direction relative to the Earth's motion.

5. A wavepacket transmission device, comprising:

a transmission source for generating a wavepacket, the wavepacket comprising a wavefront component;

a signal controller for generating a signal pulse;

a signal receiver for receiving the signal pulse;

a selective-transmission device comprising a quantum barrier defining a transmission distance, said selective-transmission device being in signal communication with the transmission source, the signal controller, and the receiver such that the wavepacket is transmitted to the barrier and the wavefront component of the wavepacket tunnels through the barrier and across the transmission distance to the receiver; and a monitor in signal communication with the receiver for determining the centroid time for each of a plurality of wavepacket peaks; and an analyzer for computing the vector group velocity of light from the measured centroid times;

wherein the selective transmission device is rotatable about an axis such that the direction of the wavepacket transmission may be shifted about the axis; and wherein the analyzer further determines the cosmic microwave background Doppler red shift direction by monitoring the group velocity tunneling time oscillation as the direction of the wavepacket transmission is shifted about the rotatable axis and determining the group velocity tunneling time minimum.

* * * * *